(12) United States Patent
Fekete et al.

(10) Patent No.: US 8,016,912 B2
(45) Date of Patent: Sep. 13, 2011

(54) PROCESS FOR RECOVERING PLATINUM GROUP METALS USING REDUCTANTS

(75) Inventors: Simon O. Fekete, Oakville (CA); Nathan M. Stubina, Oakville (CA); Jacques McMullen, Oakville (CA)

(73) Assignee: Barrick Gold Corporation, Toronto (CA)

( * ) Notice: Subject to any disclaimer, the term of this patent is extended or adjusted under 35 U.S.C. 154(b) by 40 days.

(21) Appl. No.: 12/208,954

(22) Filed: Sep. 11, 2008

(65) Prior Publication Data

US 2009/0071289 A1    Mar. 19, 2009

Related U.S. Application Data

(60) Provisional application No. 60/972,592, filed on Sep. 14, 2007.

(51) Int. Cl.
C22B 5/00 (2006.01)
C22B 7/02 (2006.01)
C22B 11/00 (2006.01)

(52) U.S. Cl. .......................................... 75/631; 75/10.62
(58) Field of Classification Search ................ 75/10.62, 75/631

See application file for complete search history.

(56) References Cited

U.S. PATENT DOCUMENTS

| 3,582,005 A | 6/1971 | Archibald et al. |
| 4,701,214 A | 10/1987 | Kaneko et al. |
| 4,701,217 A | 10/1987 | Warner |
| 4,861,368 A | 8/1989 | Brotzmann et al. |
| 5,050,848 A | 9/1991 | Hardie et al. |
| 5,480,473 A | 1/1996 | Hardie et al. |
| 5,489,325 A | 2/1996 | Keogh et al. |
| 5,492,554 A | 2/1996 | Hanniala et al. |
| 5,498,277 A | 3/1996 | Floyd et al. |
| 5,647,888 A | 7/1997 | Keogh et al. |
| 5,662,730 A | 9/1997 | Akagi et al. |
| 6,146,437 A | 11/2000 | Fourie |
| 6,289,034 B1 | 9/2001 | Bates |
| 6,478,848 B1 | 11/2002 | McCarthy et al. |
| 6,699,302 B1 * | 3/2004 | Jones et al. .................. 75/10.32 |
| 6,755,890 B1 | 6/2004 | Hanniala et al. |

FOREIGN PATENT DOCUMENTS

| AU | 199918525 | 9/1999 |
| CA | 2534623 | 3/2005 |
| EP | 0247923 | 12/1987 |
| EP | 0446860 | 3/1991 |
| EP | 0592830 | 4/1994 |
| EP | 0646758 | 4/1995 |

(Continued)

OTHER PUBLICATIONS

Phillips, et al., "Independence Platinum Limited (Ipt)—formation and objective", International Platinum Conference *'Platinum Surges Ahead'*, The Southern African Institute of Mining and Metallurgy, 2006, pp. 231-236.

(Continued)

*Primary Examiner* — George Wyszomierski
*Assistant Examiner* — Tima M McGuthry-Banks
(74) *Attorney, Agent, or Firm* — Sheridan Rose P.C.

(57) ABSTRACT

In the process of recovering platinum group metals from platinum group metal- and base metal-containing materials, the present invention uses reductants and a sulfur-deficient matte to aide the separation of the furnace matte from the furnace slag and therefore improve recovery of platinum group metals.

43 Claims, 4 Drawing Sheets

FOREIGN PATENT DOCUMENTS

| | | |
|---|---|---|
| EP | 0672881 | 9/1995 |
| EP | 1067201 | 1/2001 |
| JP | 62-280315 | 12/1987 |
| WO | WO 97/20958 | 6/1997 |
| WO | WO 98/27232 | 6/1998 |
| WO | WO 99/63835 | 12/1999 |
| WO | WO 00/01855 | 1/2000 |
| WO | WO 00/12766 | 3/2000 |
| WO | WO 00/14285 | 3/2000 |
| WO | WO 00/50652 | 8/2000 |
| WO | WO 00/70104 | 11/2000 |
| WO | WO 01/64960 | 9/2001 |
| WO | WO 02/24963 | 3/2002 |
| WO | WO 2004/065641 | 5/2004 |
| WO | WO 2005/022062 | 3/2005 |
| ZA | 77/4202 | 1/1979 |
| ZA | 88/06580 | 9/1988 |
| ZA | 8806670 | 5/1989 |
| ZA | 89/04670 | 3/1990 |
| ZA | 89/07339 | 7/1990 |
| ZA | 89/07340 | 7/1990 |
| ZA | 90/00500 | 10/1990 |
| ZA | 91/01798 | 3/1991 |
| ZA | 9107598 | 6/1992 |
| ZA | 91/08140 | 7/1992 |
| ZA | 92/01763 | 11/1992 |
| ZA | 92/04192 | 2/1993 |
| ZA | 93/01339 | 9/1993 |
| ZA | 93/04138 | 1/1994 |
| ZA | 96/02382 | 3/1996 |
| ZA | 96/03438 | 11/1996 |
| ZA | 97/11411 | 6/1998 |
| ZA | 2000/06972 | 7/1998 |
| ZA | 2001/00631 | 7/1998 |
| ZA | 2001/01606 | 8/1998 |
| ZA | 2001/01736 | 9/1998 |
| ZA | 2001/03315 | 10/2001 |
| ZA | 2000/07371 | 3/2002 |
| ZA | 2000/07317 | 5/2002 |
| ZA | 2001/08937 | 6/2002 |
| ZA | 2001/02662 | 7/2002 |
| ZA | 2001/09325 | 8/2002 |
| ZA | 2002/05292 | 7/2003 |
| ZA | 2005/010205 | 7/2003 |
| ZA | 2005/06454 | 5/2006 |
| ZA | 9703343 | 9/2007 |
| ZA | 2006/06680 | 4/2008 |
| ZA | 2006/09571 | 4/2008 |
| ZA | 2006/09689 | 4/2008 |
| ZA | 2007/01848 | 4/2008 |
| ZA | 2007/05658 | 4/2008 |
| ZA | 2005/04060 | 5/2008 |
| ZA | 2006/07288 | 5/2008 |
| ZA | 2006/09994 | 5/2008 |
| ZA | 2006/10330 | 5/2008 |
| ZA | 2007/00592 | 5/2008 |
| ZA | 2007/02600 | 7/2008 |
| ZA | 2007/03843 | 7/2008 |
| ZA | 2007/00677 | 9/2008 |
| ZA | 2007/02043 | 9/2008 |
| ZA | 2007/08105 | 9/2008 |
| ZA | 2007/05220 | 12/2008 |
| ZA | 2009/01229 | 2/2009 |
| ZA | 2008/02623 | 4/2009 |
| ZA | 2009/02819 | 4/2009 |
| ZA | 2008/06171 | 5/2009 |
| ZA | 2008/02800 | 6/2009 |
| ZA | 2008/06335 | 6/2009 |
| ZA | 2007/04039 | 7/2009 |
| ZA | 2008/07811 | 7/2009 |
| ZA | 2008/05480 | 10/2009 |
| ZA | 2009/00906 | 1/2010 |
| ZA | 2009/04464 | 4/2010 |
| ZA | 2009/09122 | 9/2010 |

OTHER PUBLICATIONS

Author Unknown, "Braemore to commence commercial smelting of PGM concentrates", Braemore Resources PLC ("Bremore"), Jul. 25, 2007, pp. 1-3.

Jones, et al., "DC arc smelting of difficult PGM-containing feed materials", International Platinum Conference 'Platinum Adding Value', South Africa Inst. Min. Met., 2004, pp. 33-36.

Nell, "Melting of platinum group metal concentrates in South Africa", The South African Institute of Mining and Metallurgy,, Aug. 2004, vol. 104, No. 7, pp. 423-428.

Barnes, et al., "Spinel removal from PGM smelting furnaces", Southern Africa Pyrometallurgy, Mar. 5-8, 2006, S. Afr. Inst. Min. Met., pp. 77-87, Johannesburg, South Africa.

International Search Report for International (PCT) Application No. PCT/IB2008/003610, mailed May 12, 2009.

Written Opinion for International (PCT) Application No. PCT/IB2008/003610, mailed May 12, 2009.

Dunkley et al., "Water atomization of PGM-containing intermediate alloys," Third International Platinum Conference, Platinum in Transformation, The Southern Africa Institute of Mining and Metallurgy, Oct. 2008, pp. 155-159.

Eccleston et al., "Development of roasting parameters for the ConRoast process with low-sulphur feedstock," Third International Platinum Conference, Platinum in Transformation, The Southern Africa Institute of Mining and Metallurgy, Oct. 2008, pp. 149-154.

Hammerschmidt, "The roasting of PGM-ore concentrates in a circulating fluidized bed," Third International Platinum Conference, Platinum in Transformation, The Southern Africa Institute of Mining and Metallurgy, Oct. 2008, pp. 161-167.

McCullough et al., "Pyrometallurgical iron removal from a PGM-containing alloy," Third International Platinum Conference, Platinum in Transformation, The Southern Africa Institute of Mining and Metallurgy, Oct. 2008, pp. 169-176.

Phillips et al., "Commercialization of the ConRoast process," Third International Platinum Conference, Platinum in Transformation, The Southern Africa Institute of Mining and Metallurgy, Oct. 2008, pp. 141-147.

Boulet et al., "Design, Simulation and Implementation of Decentralized PI Controllers for a Multivariable Feed Blending System at the Falconbridge Sudbury Smelter," Control and Optimization in Minerals, Metals and Materials Processing, 38th Annual Conference of Metallurgists, Laval University, Quebec, Canada, Aug. 1999, 15 pages.

Fragomeni et al., "Flotation Mini Pilot Plant Experience at Falconbridge Limited," MPMSC Conference Sudbury, Jun. 2006, pp. 329-356.

Official Action for Canadian Patent Application No. 2008299386, dated Dec. 7, 2010.

Background of the invention for the above-captioned application filed Sep. 11, 2008 (previously provided).

"Commercial Development of ConRoast Process in a New Independent Base Metals Refinery for Platinum Industry in South African," Minerals Engineering International Online - Pyrometallurgy, Jun. 9, 2006, http://www.min-eng.com/pyrometallurgy/46.html, 3 pages.

"Lecture 1: Introduction to Combustion, flame temperature, governing equations," 3A5 Combustion of Power Generation Lecture, Cambridge University Engineering Department, Engineering Tripos Part IIA, accessed Apr. 9 2007, pp. 1-12.

"Lecture 2: Chemical kinetics and the chemistry of combustion," 3A5 Combustion of Power Generation Lecture, Cambridge University Engineering Department, Engineering Tripos Part IIA, accessed Apr. 9 2007, pp. 1-11.

"Lecture 3: Dissociation and Equilibrium," 3A5 Combustion of Power Generation Lecture, Cambridge University Engineering Department, Engineering Tripos Part IIA, accessed Apr. 9 2007, pp. 1-8.

"Lecture 4: Autoignition," 3A5 Combustion of Power Generation Lecture, Cambridge University Engineering Department, Engineering Tripos Part IIA, accessed Apr. 9 2007, pp. 1-10.

"Lecture 5: Flame extinction — the well-stirred reactor," 3A5 Combustion of Power Generation Lecture, Cambridge University Engineering Department, Engineering Tripos Part IIA, accessed Apr. 9 2007, pp. 1-10.

"Lecture 6: Laminar premixed flames," 3A5 Combustion of Power Generation Lecture, Cambridge University Engineering Department, Engineering Tripos Part IIA, accessed Apr. 9 2007, pp. 1-13.

"Lecture 7: Laminar non-premixed flames and droplet combustion," 3A5 Combustion of Power Generation Lecture, Cambridge University Engineering Department, Engineering Tripos Part IIA, accessed Apr. 9 2007, pp. 1-13.

"Lecture 8: Pollution from combustion," 3A5 Combustion of Power Generation Lecture, Cambridge University Engineering Department, Engineering Tripos Part IIA, accessed Apr. 9 2007, pp. 1-9.

Jones et al., "Pyrometallurgy at Mintek," Southern African Pyrometallurgy, Mar. 5-8, 2006, pp. 127-150.

Jones, "ConRoast: Dc arc smelting of dead-roasted sulphide concentrates," Mintek, printed Apr. 6, 2007, http://www.mintek.co.za/Pyromet/ConRoast/ConRoast.htm, 23 pages.

International Preliminary Report on Patentability for International (PCT) Application No. PCT/IB2008/003610, mailed Mar. 31, 2011.

* cited by examiner

PROCESS FOR RECOVERING PLATINUM GROUP METALS USING REDUCTANTS

CROSS REFERENCE TO RELATED APPLICATION

The present application claims the benefits of U.S. Provisional Application Ser. No. 60/972,592, filed Sep. 14, 2007, of the same title, which is incorporated herein by this reference in its entirety.

FIELD OF THE INVENTION

The present invention relates generally to processes for recovering platinum group and base metals from platinum group and base metal-containing materials and more specifically for recovering platinum group metals from platinum group and base metal-containing materials using reductants.

BACKGROUND OF THE INVENTION

The platinum group metals (PGM) or PGMs (platinum, palladium, rhodium, iridium, osmium, and ruthenium) are becoming increasingly important to the global economy. Platinum is used for jewelry and chemical catalysts, and blends of platinum, palladium, and rhodium are used in catalytic converters.

PGMs frequently occur together in naturally occurring sulfide and silicate minerals along with iron and base metals, such as, nickel, copper, and cobalt. By way of illustration, a typical PGM sulfide concentrate contains from about 0.1 to about 15 oz/ton platinum, from about 0.1 to about 15 oz/ton palladium, from about 0.01 to about 3 oz/ton rhodium, and also contains variable amounts of nickel, copper, magnesium, cobalt, chromium, and iron. Typically, a PGM sulfide concentrate includes from about 2 to about 30 wt % iron, from about 1 to about 25 wt % magnesium, from about 0.1 to about 15 wt % nickel, from about 0.05 to about 10 wt % copper, from about 0.001 to about 0.5 wt % cobalt, from about 0.1 to about 10 wt % chromium, and from about 0.1 to about 20 wt % sulfur. The nickel and copper are typically present as sulfides, the magnesium as silicates, the iron as both sulfides and silicates, and the chromium as chromium (III) oxide as a chromite, $Cr_2O_3$, also known as a spinel, which can form spinel-like compounds of the form $MeO_X \cdot Cr_2O_3$, where X is a real number usually less than 1.0 and Me is a divalent cation typically Mg or Ca. Minerals typically containing one or more of alkali or alkali earth elements such as sodium or magnesium, respectively, as well as chromium, aluminum, and iron, all in oxide form, usually in association with $SiO_2$ are hereinafter referred to as "gangue elements" or "gangue constituents" Normally, the ratio of gangue-to-sulfide is from about 2:1 to 60:1.

Figure 1:
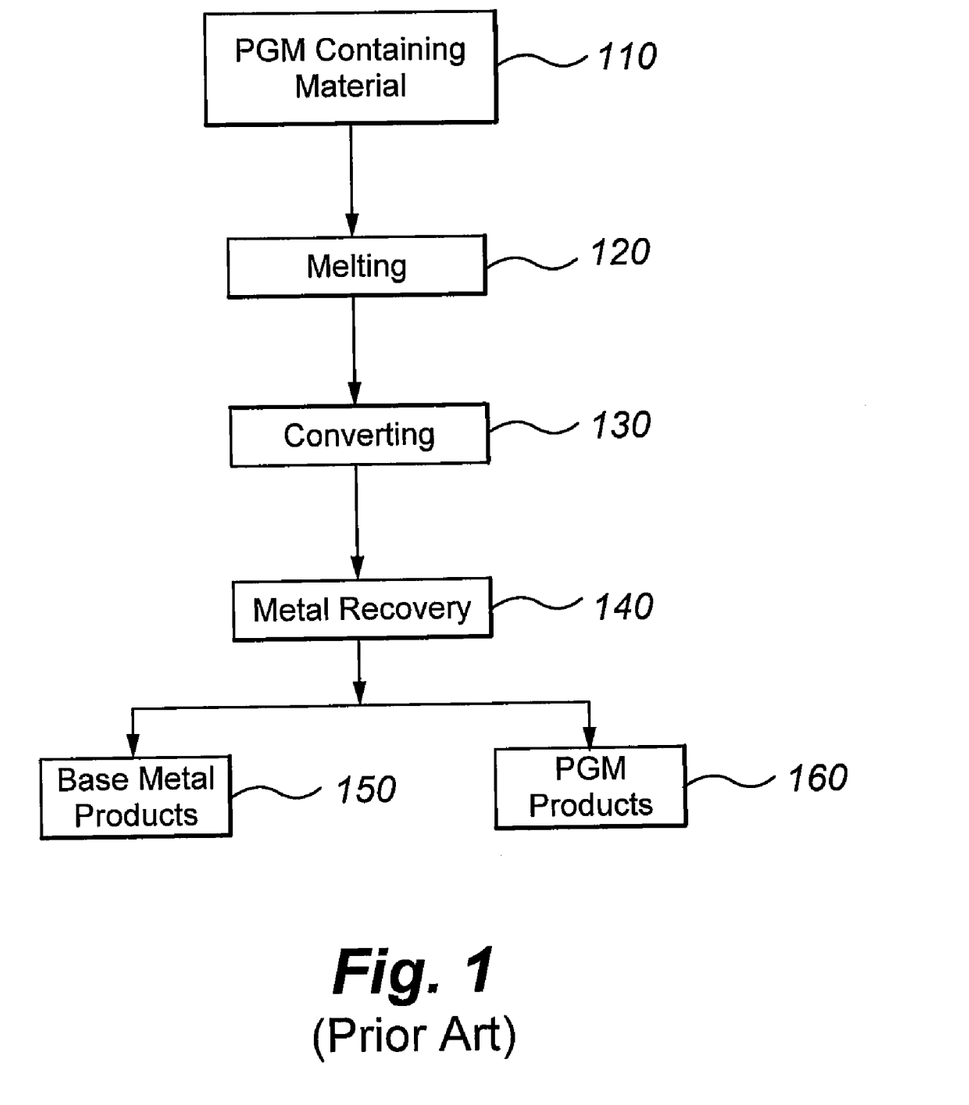
FIG. 1 depicts a prior art process for recovering PGMs and base metals from a feed material.

FIG. 1 depicts a typical process for recovering platinum group metals and base metals. The PGM-containing material 110 is processed, the processed PGM-containing material is melted 120, to form a furnace matte (containing the PGMs and base metals as sulfides), the furnace matte is converted 130 to form a converter matte (containing the PGMs and base metals), and the converter matte is processed by hydrometallurgical methods 140 to isolate, purify and recover individual base 150 and platinum group 160 metals.

Figure 4:
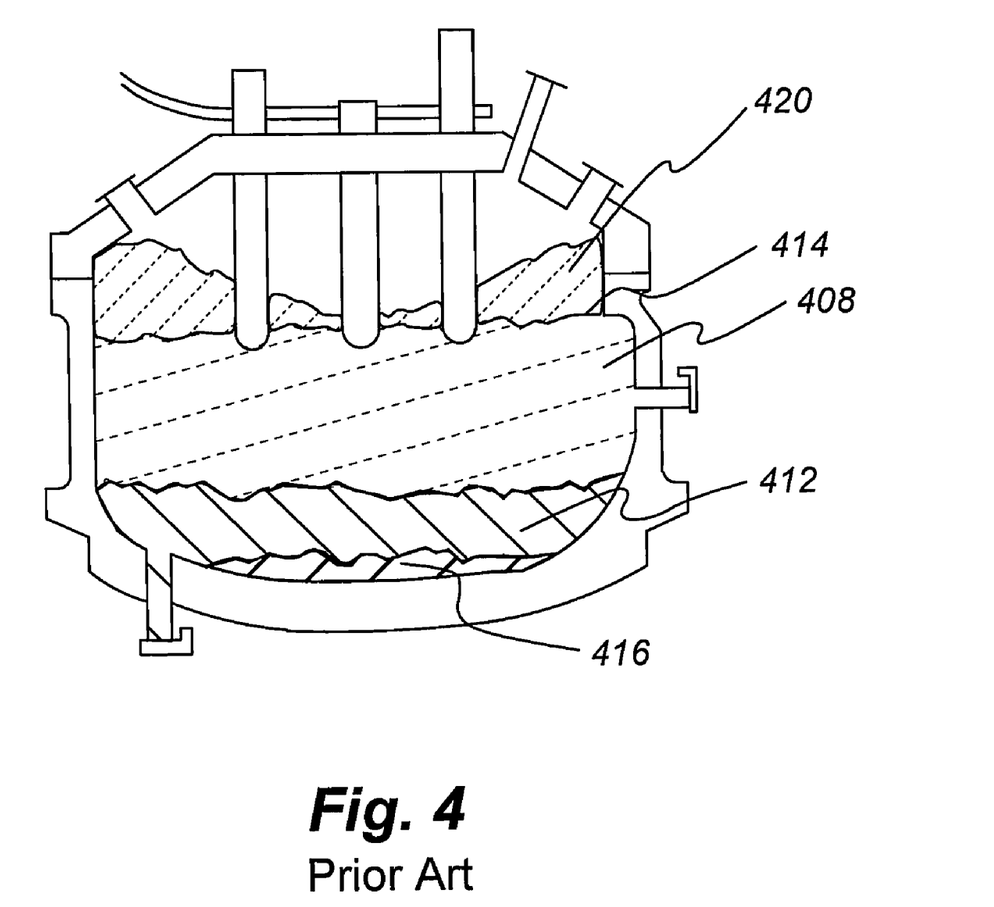
FIG. 4 depicts a furnace in accordance with the prior art.

Step 120 will be discussed in more detail with reference to FIG. 4. The unmelted material in zone 420 becomes partially liquid at the interface 414 of the unmelted material 420 and the slag 408, forming three phases: matte, slag and trivalent oxides. The partially liquefied material moves into slag 408 where the matte, slag, and trivalent oxide skeleton phases separate. The dense sulfide-containing matte phase moves into the matte 412. The matte 412 contains most of the PGMs, some of the iron, and some of the chromium. The lighter slag phase and trivalent oxides remain in the slag 408. The slag is silicate-rich and contains gangue elements, including chromium (Cr(II) and Cr(III)) oxides (such as CrO and/or $Cr_2O_3$) and iron (Fe(II) and Fe(III)) oxides (such as FeO, $Fe_3O_4$ or $Fe_2O_3$), and some PGMs and base metals. The trivalent chromium, Cr (III) and trivalent iron Fe (III), if present, form a separate spinel-like solid phase structure in the slag.

To the extent that the trivalent oxides form faster than the rate of removal through the slag tap holes they accumulate in slag 408 and eventually invade the matte 412 and some settle in zone 416, typically referred to within the art as "mush", "magnetite", "bottom" or "false bottom", owing to its tar-like consistency. The accumulation of the trivalent oxides reduces the effective working volume of the furnace crucible and reduces the time available for phase separation and settling of the matte.

A clean separation of the slag from the matte is desired to provide optimal PGM recovery; however, such a clean separation is difficult to achieve in the presence of trivalent metals, such as trivalent chromium and trivalent iron. Because the trivalent metals, especially trivalent chromium have a limited solubility in the slag, it is believed that they form a skeleton-like solid phase and cause the slag to be more viscous, which inhibits separation of the matte and slag phases and tapping of the slag from the furnace. It is also believed that the trivalent oxide skeletons trap droplets of matte, which, together with the poor phase separation, are the major causes of PGM and other value metal losses in the slag.

To improve slag fluidity and phase separation, smelters have used slag additives (e.g., fluxing agents), higher operating temperatures, and increased electromagnetic agitation. Another measure includes limiting the amount of chrome contained in the concentrate. While these measures have been helpful, current practice limits the chrome content of concentrates and exploitation of high chrome content deposits. In those deposits and concentrates having acceptable chromium oxide levels, the use of higher operating temperatures and electromagnetic agitation impact adversely the efficiency and economics of the PGM recovery process. Electromagnetic agitation of the slag leads to undesirable temperature equalization between the matte and slag, which effectively increases the matte superheat. The superheat is the difference between the actual temperature and the melting point of the matte or slag. This lowers the viscosity and increases the mobility of the matte which in turn increases mass and thermal fluxes to the walls and increases wear of the containment system. The current smelting process for high chromium PGM ores is further believed to shorten furnace life and result in high maintenance costs and more frequent and lengthy repair periods.

SUMMARY OF THE INVENTION

These and other needs are addressed by the various embodiments and configurations of the present invention. The present invention is directed generally to a process for recovering PGMs from chromite-containing materials that involves processing the PGM-bearing material under reducing conditions, in a furnace, to produce a molten slag, containing substantially all of the chromium and iron, predominantly in a divalent form, and substantially devoid of PGMs and base metals, and a sulfur-deficient molten matte containing substantially all of the PGMs and base metals.

Reductants convert trivalent oxides, particularly the oxides of chromium and iron, to a divalent form (e.g., CrO and FeO) that combine with silica (e.g., $SiO_2$) to form silicates (e.g., $FeO.SiO_2$ and $CrO.SiO_2$), which together with other silicates (e.g., $MgO.SiO_2$, $CaO.SiO_2$, etc.) form a homogeneous liquid slag. Preferred reductants are ferrosilicon and carbon-containing materials, such as coke. When coke is used as a reductant, carbon monoxide generated from the coke during the smelting process reduces oxides of iron and chromium.

The reduction of trivalent oxides of chromium and iron to their divalent forms can provide a number of benefits. It is believed that substantially decreasing or eliminating trivalent oxides will reduce the viscosity of the slag. Decreased slag viscosities can improve the efficiency and ease of separating the matte from the slag and provide for more optimal furnace operating temperatures. The above benefits associated with a decreased slag viscosity additionally provide improved PGM recoveries with improved phase separation of the matte and slag. The need to maintain a high level turbulence is reduced or eliminated and as a consequence, heat fluxes to the furnace wall are reduced, which reduces refractory wear. Other benefits include lower operating temperatures, improved furnace matte tap-hole management, and reduced risk of failure and lower maintenance costs for the refractory containment system.

Compared to a sulfur-saturated matte, a sulfur-deficient matte more effectively collects PGMs and base metals. A sulfur-deficient matte is characterized by having a sulfur content that is less than that required to form the sulfides of the metals contained in the matte. The difference between the total metals and the metals accountable as sulfides are the "metallics." The degree of sulfur deficiency also imposes a degree of oxygen potential; that is to say, the lower the sulfur content, the higher is the metallic content and the lower is the oxygen potential. To state it differently, the higher the sulfur deficiency, the higher is the amount of metallics and the reducing potential. The matte and slag interact such that the reducing potential of the matte is imposed on the slag. Thus, measurement and control of the reducing potential of the matte can be used to adjust the reductant addition of the furnace feed to achieve the desired slag properties.

A sulfur deficiency in the matte also has other advantages. For example, it increases the melt or liquidus temperature of the matte. Generally, the greater is the sulfur deficiency the higher is the melt temperature, the other conditions (e.g., the ratio of nickel to copper) being equal. Sulfur saturated mattes have a low melt temperature in some cases less than 900° C. (e.g., very high nickel-to-copper ratio mattes). Molten matte hydraulic properties, such as fluidity or viscosity, are dependent on the degree of superheat, which is the difference between the actual temperature and the matte melt temperature. In a typical PGM smelting practice, the temperature of the slag is about 1550° C. or higher and the corresponding matte is about 1400° C., which means that the matte is at least about 500° C. above its melt temperature. With this degree of superheat, the matte is very fluid and mobile, which greatly enhances undesirable mass and thermal fluxes to the furnace sidewalls, especially when electromagnetic stirring is applied. In contrast, the melt temperature of a sulfur deficient matte is much higher, and can be as high as about 1350° C., which provides a significantly lower degree of superheat.

The process can have other advantages. By way of example, the invention can produce a slag having desirable properties, including, relative to slags of the prior art, a lower viscosity and higher concentration of chromium, and produce mattes having desirable properties relative to mattes of the prior art, including a higher melting point, a lower superheat, and a higher viscosity. Lower matte superheat can provide easier tap-hole management, reduced risk, and lower maintenance costs for the refractory containment system. The process can also produce a more effective separation of the slag from the matte due to the elimination or substantial elimination of the skeleton-like solid phase in the slag and matte zones 408 and 412 and a higher crucible capacity by the substantial elimination of the mush zone 416 and skeleton-like solid phase in zones 408 and 412. Improved separation of the slag from the matte means a higher recovery of PGMs and valuable base metals. Heat transfer effects are improved by the invention's ability to reduce or eliminate the need for electromagnetic stirring, which can reduce the heat transfer rate between matte and slag, increase the temperature differential between matte and slag phases, and reduce the degree of superheat in the matte. Lowering the need for high turbulence stirring can reduce sidewall heat fluxes and refractory wear. It can provide a longer furnace life, due to more optimal operating conditions in the furnace. It can avoid the use of fluxing agents entirely or substantially reduce the use of flux, which means reduced operating costs. Unlike prior art processes, the process can handle PGM ores and concentrates having relatively high chromium concentrations.

These and other advantages will be apparent from the disclosure of the invention contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The present invention provides an improved pyrometallurgical process for recovering platinum group metals from a PGM-bearing material, specifically an improved process for recovering PGM metals from PGM-bearing materials containing chromium, and, more specifically, PGM-bearing materials containing chromium in the form of chromium (III) oxide. The PGM-bearing material can include oxide, siliceous, and/or sulfur-bearing minerals, run-of-the mine material, or a partially or fully processed material, such as a flotation concentrate, leaching residue or tailings, or recycled industrial matter, spoil, or waste and mixtures thereof.

Figure 2:
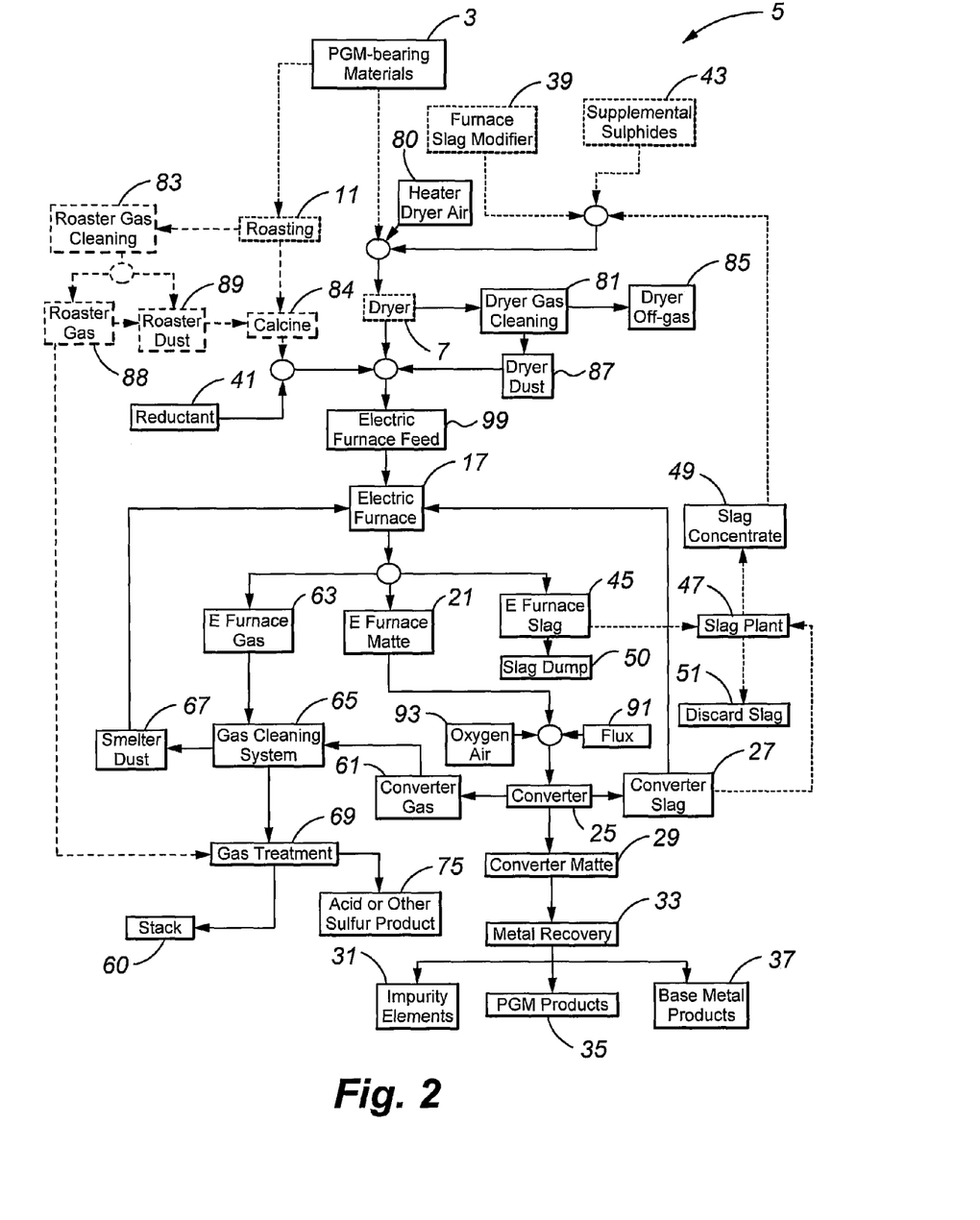
FIG. 2 depicts a portion of the PGM recovery process in accordance with an embodiment of the present invention.

FIG. 2 is a flow chart according to an embodiment of the present invention. Referring to FIG. 2, a PGM-bearing material 3 containing a substantial amount of water (0.5 wt % or higher) may undergo an optional drying 7 stage to remove most of the water, thereby reducing the thermal load on the electric furnace. A heated dryer air 80 is passed through the material 3 and exits as exhaust dryer gas and is cleaned, as for example, by filtration or electrostatic precipitation in step 81 of the entrained fine particles, to form dust 87 and cleaned dryer off gas 85, which is discharged to the atmosphere. The removed dust 87 is recombined with the dried PGM-containing material. In one configuration, the material to be dried includes the slag modifier 39, supplemental sulfides 43, and/or slag concentrate 49, each of which is discussed in detail below.

Dry PGM-bearing material having a sulfur content exceeding that required for forming sulfides with the base metals and, optionally, iron contained in the matte 21 can undergo an optional (partial) roast 11 to eliminate part of the sulfur. The amount of sulfur in the furnace matte is a component in determining the oxygen potential of the molten furnace slag and matte. Or, stated another way, the sulfur content of furnace matte is a component that determines the oxygen potential of the furnace matte and slag. A sulfur-deficient furnace matte in contact with a slag is capable of reducing trivalent oxides to divalent oxides due to the low oxygen potential, while a sulfur-rich matte with a high oxygen potential cannot reduce trivalent oxides to divalent oxides.

In one configuration, the calcine 84 has a sulfur content high enough to provide the requisite sulfur to form sulfides with the base metals in the furnace matte 21, considering the amount of sulfur that normally escape in the electric furnace gas 63 and leaves in the furnace slag 45. In this manner, when the calcine is smelted to produce a furnace matte 21 and the furnace matte is converted to produce a converter matte 29, the converter gas 61 is substantially free of sulfur dioxide. Stated another way, the roaster off-gas 88 contains substantially all of the sulfur in a gas stream concentrated in sulfur dioxide, thus simplifying sulfur emission control.

The concept of base metal sulfur demand is well known within the art. By pyrometallurgical convention, sulfur is assumed to associate with metals in a molten mixture in the order of most to least preferred as follows:

(i) $Ni_3S_2$
(ii) $Cu_2S$
(iii) $CoS$
(iv) $FeS$.

Thus in a molten mixture, sulfur is assumed first to associate with nickel, second with copper, third with cobalt, and finally with iron. When there is insufficient sulfur to associate with all of the iron, the unassociated iron is said to be "metallic", henceforth referred to as $Fe_{Me}$.

With this convention in mind, the base metal sulfur demand can be calculated by Equation 1:

$$\text{Base metal sulfur demand in moles} = (2*Ni)/3 + Cu/2 + Co \quad (1)$$

where Ni, Cu and Co, respectively, represent the number of moles of Ni, Cu and Co in the molten matte. The sulfur available to meet the iron demand within a furnace feed is set forth in equation 2 as:

$$S_{Fe} = S_{total} - [Co + (2*Ni/3) + (Cu/2)] \quad (2)$$

where Co, Ni, Cu and $S_{total}$ represent the number of moles of the respective element needed to form the furnace matte. Or, stated another way, the $Fe_{Me}$ content of the matte (in weight percent) is provided by the following equation:

$$Fe_{Me} = Fe - (S - (Ni*2*32.06/(3*58.69) + Cu*32.06/(2*63.55) + Co*32.06/58.94))/32.06*55.85 \quad (3)$$

where the letters in the formula represent the percent of the element in the matte. The $Fe_{Me}$ calculated in the aforementioned manner is related to, and is used as a proxy for, the oxygen potential of the matte, which quantitatively relates to the ratio of divalent to trivalent chromium oxide and/or the divalent to trivalent iron oxide in the slag.

The foregoing calculations ignore the presence of chromium in the matte. Optionally chromium may be added to the $Fe_{Me}$ as determined by equation (3) above and used as a proxy for the oxygen potential of the matte.

The roast 11 removes at least some sulfur to produce calcine 84, which, upon smelting with a reductant, will produce a furnace matte 21 with $Fe_{Me}$ content representing an oxygen potential that ensures that at least most, if not all, of the chromium and iron in the furnace slag 45 and furnace matte 21 are in their divalent forms. Stated another way, the optional roast 11 preferably removes sufficient sulfur to produce a furnace matte 21 in which the $Fe_{Me}$ content is about 90 wt % or less, more preferably ranges from about 10 wt % to about 80 wt %, and even more preferably ranges from about 10 wt % to about 75 wt %.

The roaster off-gas 88, which typically contains most of the excess sulfur in the material 3 as sulfur dioxide, $SO_2$, is cleaned in step 83, such as by filtration or electrostatic precipitation, to remove dust 89 and the cleaned roaster gas 88 processed by the gas treatment 69 before discharge through stack 60 to the atmosphere. The dust 89 is combined with the calcine 84.

Figure 3:
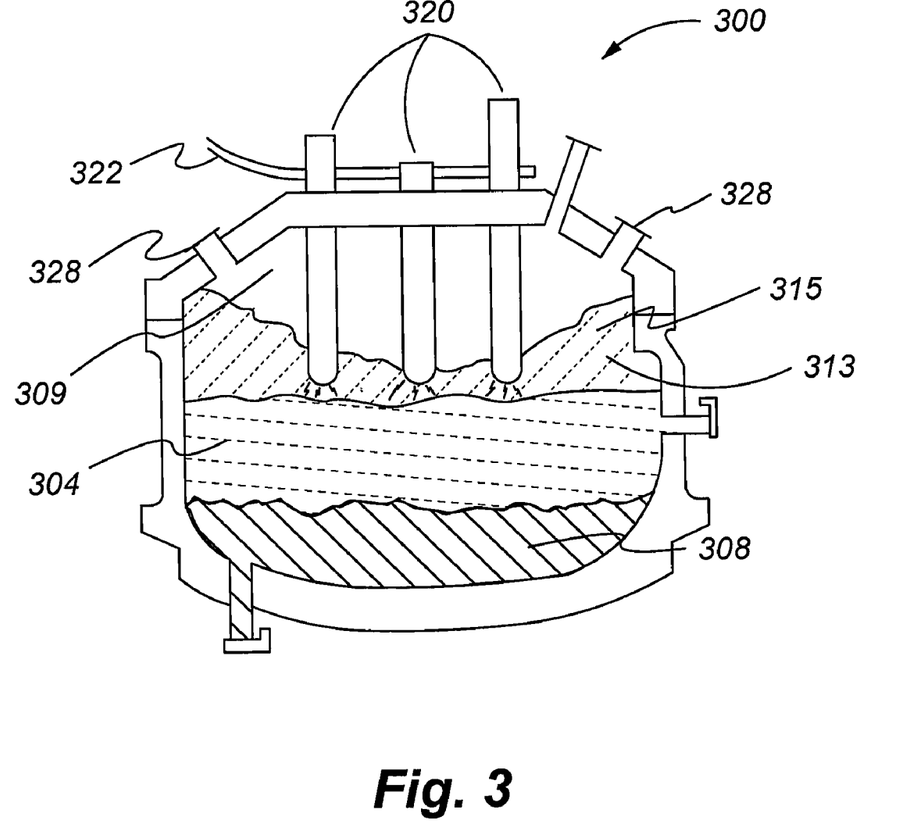
FIG. 3 depicts a furnace in accordance with an embodiment of the present invention.

The PGM-containing material 3 directly, or after optional drying stage 7 or roasting stage 11 (in which case the PGM material 3 is in the form of the calcine 84 and dust 89), as the case may be, along with other feed ingredients (i.e. reductant 41, supplemental sulfides 43, converter slag 27, smelter dust 67, slag concentrate 49, and/or slag modifier 39) (some of which may contain significant amounts of PGMs and trivalent iron and chromium oxides), form the electric furnace feed 99 and charged to electric furnace 17 through inlet ports 328. The feed ingredients may be fed to the electric furnace individually or in different combinations of mixtures. Preferably, the furnace 17 is operated under reducing conditions to produce a sulfur-deficient matte 21, 308 that acts as a collector for PGMs and converts and maintains at least most of the chromium and iron present within the furnace feed as chromium (II) and iron (II) rather than chromium (III) and iron (III), respectively. CrO and FeO are more soluble in the slag, making it easier to remove the chromium and iron oxides from the furnace and avoiding the problems of the prior art arising from the presence of chromium and iron spinels. The slag 45, 304 contains preferably at least about 50% and more preferably at least about 75%, and even more preferably at least about 95% of the chromium in the PGM-bearing material 3 as Cr(II)O. Preferably, substantially all of the iron and at least about 75%, more preferably at least about 85%, even more preferably at least about 90%, and even more preferably substantially all of the chromium (III) present in the furnace feed 99 are reduced to their divalent forms.

The reductant 41 can be any suitable reducing material, including without limitation, one or more of metals, metal alloys, (inorganic and organic) carbon-containing materials (e.g., coal), and/or carbides, more preferably pig iron, aluminum, magnesium, metals, ferrosilicon, anthracites with low volatile matter, and/or coke, and even more preferably ferrosilicon, magnesium, petroleum coke, or delayed coke commonly produced in the refining of liquid petroleum products. Ferrosilicon is a ferro alloy of iron and silicon, known for its deoxidizing properties. Ferrosilicon commonly has between about 15 and 90% silicon that also typically contains from about 1 to 2% calcium and aluminum. Coke is the carbonaceous residue of the destructive distillation (carbonization) of a, typically bituminous coal, petroleum, and/or coal-tar pitch. Carbide is a binary solid compound of carbon and another element. Exemplary carbides are those of calcium, tungsten, silicon, boron, and iron (cementite). The preferred amount of reductant 41 is determined by the amount of oxygen that has to be removed from the furnace charge, called the "charge oxygen".

In one implementation, the reductant is an organic or inorganic carbon-containing compound. When a carbon-containing reductant is employed, the carbon undergoes the following reactions:

$$Me_2O_3 + CO \rightarrow 2MeO + CO_2 \quad (4)$$

$$MeO + CO \rightarrow Me + CO_2 \quad (5)$$

$$Me_2O + CO \rightarrow 2Me + CO_2 \quad (6)$$

$$CO_2 + C \rightarrow 2CO \quad (7)$$

$$2CO + O_2 \rightarrow 2CO_2 \quad (8)$$

where "Me" represents chromium, iron, nickel, cobalt, copper, lead, zinc, or PGMs in mono-, di- or tri-valent form, "O",(with atomic weight 16) represents the oxygen in the form of an oxide and "C" carbon,"(with atomic weight 12.01) in the form of carbon-containing material, such as coke, or coal or a carbon containing alloy. As can be seen from these equations, under the reductive conditions carbon dioxide is reduced to carbon monoxide, which acts as the reductant for oxides of iron and chromium. In one embodiment, the carbon-to-charge oxygen mole ratio, C/O, in the furnace feed ranges from about 1.0 to 2.0, more preferably from about 1.0 to 1.5, and even more preferably from about 1.0 to 1.0.

In another implementation, the reductant is a metal, metallic alloy or carbide having an affinity for oxygen greater than that of FeO. The use of metallic magnesium as a reductant is illustrated as follows:

$$FeO + Mg \rightarrow Fe + MgO \quad (9)$$

$$Cr_2O_3 + Mg \rightarrow 2CrO + MgO \quad (10)$$

The use of carbide as a reductant is illustrated with the use of silicon carbide $$2FeO + Cr_2O_3 + SiC \rightarrow 2Fe + 2CrO + SiO_2 + CO \quad (11)$$

The MgO, CrO and $SiO_2$ become part of the slag, while in the case of reaction (11) the CO undergoes similar reactions as that occurring when using carbon as a reductant.

The furnace feed can further include supplemental sulfides 43. The supplemental sulfide 43 can be any sulfur-bearing material, such as elemental sulfur, pyrite, a sulfide-containing compound, such as $MS_X$ where S is sulfur, X is a real number greater than zero, and M is a cationic species, e.g., Fe, Ni, Cu, capable of providing sulfur, during smelting in the furnace 17, to meet base metal demand and, if desired, some of the iron demand. In one embodiment, less than a stoichiometric amount of sulfur is present in the feed 99 to provide a sulfur-deficient matte that acts as a collector for the PGMs. As set forth in Equation 12, the feed to the electric furnace 17 is sulfur-deficient when:

$$Cr + Fe + Co + (2*Ni/3) + (Cu/2) > S \quad (12)$$

where Cr, Fe, Co, Ni, Cu and S represent the number of moles of the respective element in the electric furnace feed available to form the furnace matte. The left-hand portion of equation 12, $Cr+Fe+Co+(2*Ni/3)+(Cu/2)$, represents the sulfur demand of the furnace matte, and the right-hand portion of equation 12 represents the total amount of sulfur available in the furnace feed to meet the sulfur demand of the furnace matte. When the moles of sulfur are less than the left-hand portion of the equation, sufficient amount of supplemental sulphide is added to the electric furnace feed to meet the sulfur demand of the furnace matte. When the moles of sulfur are more than the left-hand portion, the feed can be made sulfur-deficient to a desired degree by adding an appropriate amount of material containing oxides of base metals or iron, such as converter slag 27, to the feed.

The furnace feed can further include a furnace slag modifier 39 to improve the electric furnace slag 45 properties such as, but not limited to, slag viscosity and melt temperature. High slag viscosities impair the partitioning of the slag and the matte into separate and distinct liquid phrases. Lower slag melt temperatures are preferred. Low melt temperature slags reduce the severity of operational wear on the refractory containment system. In certain applications, a slag modifier, such as lime, can improve fluidity. In many applications, no slag modifier is added due to the mineralogy where the constituents of the PGM-containing material are suitable for producing a good slag.

Finally, the furnace feed can include converter slag 27. Typically, at least about 10%, more typically at least about 50%, and more typically from about 90 to about 100% of the slag 27 is recycled to the furnace feed, with the remainder (if any) being forwarded to the slag plant 47.

The furnace feed is formed such that, when the combined ingredients are melted, a furnace matte of desired composition and reasonable mass for collecting and concentrating the precious metal and a slag of desired composition and suitable melting point and viscosity are produced. Typically, the matte 308 (or electric furnace matte 21) contains from about 5 to about 32 wt % and more typically from about 5 to about 25 wt %, and most typically from about 5 to about 20 wt % sulfur. The major constituents of the slag are silicates of magnesium and iron with minor amounts of aluminum, alkali and alkaline earth metal oxides (eg. $(MeO)_x.SiO_2$ or $(Me_2O)_x.SiO_2$ where Me denotes mono- or divalent cations): typically, FeO, MgO, and $SiO_2$ account for about 80 wt % to 90 wt % of the slag from PGM bearing concentrate smelting. The FeO content of the slag is typically in the range of about 5 to 25 wt %, and more typically in the range of about 10 to 20 wt %.

Typically, the melting temperature (liquidus) of the furnace slag is greater than the melting temperature of the furnace matte. At any given level of $SiO_2$-to-MgO weight ratio, FeO has only a small influence on the liquidus temperature of the slag. Other minor constituents of the slag also have a minor influence on the slag liquidus, including chromium oxide, as long as it is in the divalent form. Trivalent chromium oxide is very sparingly soluble in the slag or matte and, if present, would be in a solid form causing, among other deleterious effects, an increase in viscosity, thereby inhibiting phase separation. The reducing environment can prevent the formation of trivalent chromium and substantially remove at least some if not all trivalent chromium. The liquidus temperature of these slags are in the range of about 1450 to 1600° C. and primarily dependent on the $SiO_2$-to-MgO weight ratio which is in the range of about 1.5 to 2.5 Generally, the higher this ratio the lower is the liquidus temperature.

The slag superheat temperature is the difference between the slag 304 temperature and the slag liquidus temperature, and the matte superheat is the difference between the matte temperature and the matte liquidus temperature. The slag superheat temperature preferably ranges from about 50 to 200° C. and more preferably from about 50 to 100° C. and the matte superheat is preferably no more than about 400° C., more preferably ranges from about 50 to about 250° C. and even more preferably ranges from about 50 to about 150° C.

Delta is the difference between the slag 304 and matte 308 temperatures, and is typically a positive number since the slag temperature is typically greater than the matte temperature. Delta depends on the heat flux between matte 308 and slag 304, which in turn depends on the hydraulic characteristic of the matte and slag and the mode of power supply. The matte liquidus temperature depends on the $Fe_{Me}$ content, see formula (3), and the copper-to-nickel ratio of the matte. A preferred embodiment contemplates at least one of a low degree of slag superheat and/or a low degree of matte superheat and/or a high delta. Preferably, the delta is in the range of about 100 to 300° C., more preferably the delta is in the range of about 150 to 300° C., and even more preferably the delta is in the range of about 150 to 250° C.

To provide these properties, the preferred composition of the electric furnace feed 99 yields a furnace matte 308 having sufficient sulfur to satisfy the base metal demand and, at most, only part of the iron demand. The preferred molar ratio of sulfur-to-iron (excluding the base metal sulfur demand) is less than about 0.0 to 0.90, more preferably less than about 0.0 to 0.25, and even more preferably less than about 0.0 to 0.15

Returning to FIGS. 2 and 3, the electric furnace feed 99, upon introduction into the electric furnace 17, forms a sloping mass of solid material 315, supported by the molten slag and matte phases 304 and 308, respectively. The freeboard 309 is, compared to the molten slag and matte phases, relatively cool. The solid layer is in downward motion as it melts at the bottom due to the heat generated by electrical current. During the downward movement, the material is heated and undergoes physical and chemical changes. By way of example, oxygen is exchanged between metal oxides, such as iron and chromium oxides, on the one hand and the reductant and sulfides on the other, generating carbon monoxide (CO), carbon dioxide ($CO_2$) and various gaseous compounds, including sulfur dioxide ($SO_2$). The various solid constituents are fused and melted, and finally the matte and slag phases separate. PGMs are preferentially soluble in the matte phase due to the presence of nickel and copper sulfides. Above the solid layer 315 is the freeboard 309, which serves as a chamber where the gaseous reaction products emerging from the bank of solids collect and mix with atmospheric air that enters through openings in the furnace. In one embodiment, carbon monoxide (CO) is converted to carbon dioxide ($CO_2$) within the freeboard 309 and becomes a component of the off gas 63.

Electrical power is supplied to the electrodes 320 by the power cable 322. Heating of the furnace 300 occurs by resistive heating in response to the electric current flowing from electrodes 320 primarily through slag phase 304. The electrical energy supplied by electrodes 320 melts the solid furnace feed material 315, which descends into slag 304. The temperature of slag 304 during furnace operation step 17 is typically greater than the slag liquidus temperature. At and above the interface 313 of the solid furnace feed material 315 and molten slag 304, reactions (4), (5), (6) and (7) produce metallics for the furnace matte and CO that reduces the trivalent base metal oxides of the furnace feed 315, as the carbon monoxide ascends through the feed 315. The $CO_2$ and CO as well as other gaseous compounds produced enter freeboard 309 where molecular oxygen, from any ingressing air, oxidizes any CO according to reaction (8) Preferably, the mixing and heat flux between matte and slag are kept low by substantially minimizing the electromagnetic agitation. In other words, the power is supplied at maximum voltage and minimum current between the electrodes, consistent with electrical characteristics of the slag and geometry of the furnace. In one embodiment of this invention the tip of the electrodes are positioned above the molten pool of slag, creating an arc consisting of ionized gases (the plasma) that establishes a conductive path through the molten slag between at least two electrodes. The preferred embodiment involves positioning of the electrode tips relative to (above) the surface of the molten pool of slag and establishing a plasma preferably through which 0.0 to 90.0%, more preferably 50.0 to 90.0% and even more preferably 75.0 to 90.0 of the power is delivered to the furnace. Other embodiments of this invention, contemplate submerging the electrode tips in the molten pool of slag, with the slag acting as the sole resistance between electrodes, would involve changing the power input by adjusting the voltage between the electrodes and changing the resistance by adjusting the slag depth while maintaining a constant electrode penetration and current flow. In a more preferred embodiment, the power is changed by adjusting the voltage between the electrodes and changing the resistance by a combination of adjusting the slag depth and electrode penetration into the slag while maintaining a constant current flow.

Although any suitable furnace can be used, the melting is typically performed in a refractory brick lined electric arc furnace, as depicted in FIG. 3. The furnace can have any configuration. By way of illustration, though FIG. 3 shows a three-electrode furnace it is to be understood that a six-in-line furnace may be employed.

The reductive conditions in the furnace can produce a desirable distribution of elements between the slag 304 and matte 308. Typically, at least about 15% of the cobalt, at least about 85% of all other base metals and PGMs in the furnace feed, and no more than about 50% of the chromium and iron in the furnace feed are recovered in the furnace matte 21 or 308. In contrast, the slag 304 (or electric furnace slag 45) typically contains no more than about 1 wt % sulfur, more than about 50% of the iron in the furnace feed, no more than about 1% of the PGMs in the furnace feed, no more than about 85% of the cobalt in the furnace feed, no more than about 15% of all other base metals in the furnace feed, at least about 99% of the silica in the furnace feed, at least about 99% of the magnesium in the furnace feed, and at least about 50% of the chromium in the furnace feed.

In a preferred embodiment the electric furnace slag 45 is discarded directly to the slag dump 50. Alternatively the electric furnace slag 50 is processed by slag plant 47 to produce a discard fraction 51 and a slag concentrate 49, which is recycled to the electric furnace with other feed ingredients.

In step 25, the furnace matte 21, is converted with air which may be enriched by the addition of molecular oxygen 93, and silica flux 91 to converter matte 29, converter slag 27, and converter (off) gas 61. Converter 25 can be any conventional Peirce Smith or Top Blown Rotary Converters (TBRC) or any other suitable device.

The converter matte 29 will contain substantially all of the PGM and other precious metals (e.g., gold, silver), most of the base metals and varying amounts sulfur and iron. The amount of iron in the matte 29 usually ranges from about 0.5 to 5 wt % and the amount of sulfur from about 8 to 24 wt % and are determined by the needs of the hydrometallurgical metal recovery 33 refinery, that produces the refined precious metals, base metals and minor amounts of impurity elements 31 normally associated with PGM bearing concentrates (e.g., Pb, Zn, Cd, etc.). The converter matte 29 is processed by standard metal recovery 33 methods. The base metal products 37 and precious metal products 35 are recovered by known techniques, such as isolation and purification by precipitation and/or by adsorption/desorption and electrowinning processes.

The converter slag 27 commonly contains all the iron not reporting to the converter matte, substantially all of the chromium from the furnace matte 29, substantially all of the silica and components of the converter flux, and sulfur in the range of from about 0.5 to 2 wt %. All of the components of the converter slag are in the oxide form, except for a small amount of entrapped sulfides and trace amounts of precious metals that may be in a metallic form. Substantially all of the chromium and from about 30 to 50% of the iron in the converter slag are in the trivalent form. In the preferred embodiment the converter slag 27 is returned to the electric furnace 17 Optionally, the converter slag 27 is combined with the electric furnace slag 45 and processed in the slag plant 47 to produce a discard fraction 51 and slag concentrate 49 for recycle to the electric furnace with other feed ingredients.

The various off gases 88, 63, and 61 are processed by gas treatment facility 69 to convert $SO_2$ to sulfuric acid or elemental sulfur or other forms of sulfur 75 depending on the configuration of the gas treatment system 69 and the process economics.

In one configuration, at least most, and even more preferably at least about 90%, of the $SO_2$ generated within process 5 is generated by roast 11. The converter gas 61 contains the sulfur not reporting to the converter matte 29 and converter slag 27, in the form of $SO_2$ and some dust, typically less than 5.0% of the combined weight of the furnace matte and converter flux. In one embodiment of this invention the sulfur content of the electric furnace matte 21 is less than or just sufficient to form the respective base metal sulfides in the converter matte and, as a consequence, the converter gas 61 will be substantially free of $SO_2$.

In another configuration, the reductive furnace operation provides a significantly lower concentration of sulfur dioxide in the off-gas 63, thereby reducing the burden on and simplifying the operation of the gas treatment system 69. As will be appreciated, the reductant in zone 315 will react with the oxides and inhibit the oxidation of the sulfides and formation of $SO_2$. Preferably, no more than about 10% of the sulfur in the furnace feed is contained in the freeboard 309 (or off-gas 63) and more preferably, no more than 5% of the sulfur in the furnace feed is contained in the freeboard 309 (or off-gas 63).

Any dust generated by the electric furnace 17 and converter 25 and entrained in the electric furnace or converter gases 63 and 61 is separated by gas cleaning system 65 as smelter dust 67. The separation is typically performed by electrostatic precipitation or filtration, such as a baghouse. The smelter dust 67 is charged to the electric furnace 17.

Experimental

A number of small scale experiments were conducted in an effort to illustrate the benefits of utilizing the teaching of this invention in the smelting of PGM bearing concentrates, especially those concentrates that can not be treated using existing art technologies.

The experiments were conducted by equilibrating mattes of various compositions with typical slags that would be produced in the smelting of PGM bearing concentrates with a reductant. Test charges were made up by mixing various products that contained all the ingredients that would be included in a typical electric furnace feed 99. The proportions of the various electric furnace feed ingredient in each of the test charges were determined that upon melting would yield a matte and slag of a predetermined composition. The charges were placed in a small refractory crucible and fused (melted) and maintained at the desired temperature for one hour under a neutral atmosphere. The crucibles were then dropped into cold water to undergo very rapid cooling and to preserve the morphology of the various phases present at the melt temperature. The quenched samples were then subjected to customary electron probe analysis to identify the various phases in terms of morphology and composition. The measurements consisted of determining the elemental composition of the matte and slag phases, and determining if there is any presence of spinel as a third phase.

A series of tests performed at 1550° C. investigated the maximum solubility of divalent Cr(II) chromium in a slag of constant composition in contact with mattes of a wide range of sulphur deficiency or, stating it another way, a wide range of $Fe_{Me}$ content.

Table 1 illustrates the very significant impact of $Fe_{Me}$ on the chromium levels in the matte and slag. The chromium content of the slags in Table 1 represent "saturation" levels of divalent chromium, that is to say, further increases would cause spinel precipitation as a third phase. The data in Table 1 also clearly illustrate that decreasing the $Fe_{Me}$ in the matte will increase the chrome content of the matte, while the saturation chrome levels in the slag decreases.

A similar set of experiments were carried out at 1480° C. for which the data is shown in Table 2. While the chrome levels in both matte and slag are moderately lower than those in Table 1, the trends are identical.

The data in Tables 1 and 2 illustrate that smelting of PGM concentrates with a reductant increases very significantly the range of choices for furnace feed in terms of chromium as well as sulphur and base metal content. It is clear that, with appropriate choices for reductant addition relative to the furnace feed composition, it is possible to avoid formation of spinels. The data also indicates that $Fe_{Me}$ decreases the chromium content of the matte which significantly benefits the converter operation, while at the same time the saturation chrome level in the slag increases.

TABLE 1

Saturation Chromium Content of Slags at 1550° C. in Contact With Mattes of Various $Fe_{Me}$ Contents

| | Composition of Matte Wt % | | | | | | |
|---|---|---|---|---|---|---|---|
| test No | $Fe_{Me}$ | S | Cr | Fe | Co | Ni | Cu |
| 1 | 78.98 | 6.28 | 1.73 | 81.30 | 2.01 | 5.97 | 2.70 |
| 2 | 46.54 | 16.75 | 2.31 | 61.67 | 2.33 | 10.65 | 6.29 |
| 3 | 34.43 | 20.69 | 2.68 | 54.63 | 2.09 | 12.48 | 7.42 |
| 4 | 21.22 | 24.56 | 3.57 | 44.94 | 1.98 | 15.56 | 8.53 |
| 5 | 13.68 | 27.01 | 4.25 | 40.02 | 1.93 | 16.74 | 9.14 |
| 6 | 7.20 | 28.44 | 3.71 | 33.08 | 1.50 | 22.12 | 10.27 |

| | Composition of Slag Wt % | | | | | |
|---|---|---|---|---|---|---|
| test No | MgO | Al2O3 | SiO2 | CaO | FeO | Cr |
| 1 | 27.09 | 2.95 | 46.93 | 3.26 | 9.23 | 6.39 |
| 2 | 27.76 | 2.98 | 46.38 | 3.16 | 9.85 | 5.61 |
| 3 | 27.98 | 2.99 | 46.64 | 3.21 | 9.63 | 5.39 |
| 4 | 28.01 | 3.42 | 48.27 | 3.25 | 8.19 | 5.18 |
| 5 | 28.23 | 3.42 | 49.06 | 3.26 | 7.93 | 4.66 |
| 6 | 29.28 | 3.37 | 51.00 | 3.37 | 6.78 | 3.34 |

TABLE 2

Saturation Chromium Content of Slags at 1480° C. in Contact With Mattes of Various $Fe_{Me}$ Contents

| | Composition of Matte Wt % | | | | | |
|---|---|---|---|---|---|---|
| test No | $Fe_{Me}$ | S | Cr | Fe | Co | Ni | Cu |
| 7 | 72.81 | 8.20 | 1.32 | 77.77 | 2.08 | 6.94 | 3.69 |
| 8 | 48.83 | 16.04 | 1.80 | 63.84 | 2.15 | 10.17 | 6.01 |
| 9 | 39.36 | 19.13 | 2.09 | 58.50 | 1.96 | 11.24 | 7.07 |
| 10 | 23.70 | 23.70 | 2.50 | 46.50 | 1.39 | 16.91 | 9.00 |

| | Composition of Slag Wt % | | | | | |
|---|---|---|---|---|---|---|
| test No | MgO | Al2O3 | SiO2 | CaO | FeO | Cr |
| 7 | 24.53 | 3.32 | 50.41 | 3.51 | 8.68 | 5.67 |
| 8 | 24.76 | 3.51 | 49.20 | 3.48 | 9.86 | 5.15 |
| 9 | 25.31 | 3.51 | 49.08 | 3.52 | 9.62 | 5.01 |
| 10 | 25.06 | 3.46 | 51.17 | 3.64 | 9.03 | 4.32 |

Existing technologies frequently use additives, such as CaO, to the slag to mitigate the detrimental effect of chromium. Use of additives increases the mass of slag and power consumption. The data given in Table 3 illustrates that increased levels of CaO in the slag significantly reduces the saturation of chrome levels. The use of reductant under proper control eliminates spinels from the slag and negates the need for additives to improve slag behavior, thereby eliminating the cost of additive as well as the cost of additional power due to increase in the mass of slag produced.

TABLE 3

Impact of Using CaO as Slag Modifier on Saturation Chromium Content of the Slag at 1550° C.

| | Composition of Matte Wt % | | | | | |
|---|---|---|---|---|---|---|
| test No | $Fe_{Me}$ | S | Cr | Fe | Co | Ni | Cu |
| 11 | 47.05 | 16.59 | 2.29 | 62.07 | 2.29 | 10.55 | 6.19 |
| 12 | 44.32 | 17.68 | 2.02 | 61.99 | 2.30 | 9.80 | 6.20 |
| 13 | 44.36 | 17.61 | 1.22 | 62.30 | 2.44 | 10.14 | 6.29 |

| | Composition of Slag Wt % | | | | | |
|---|---|---|---|---|---|---|
| test No | MgO | Al2O3 | SiO2 | CaO | FeO | Cr |
| 11 | 27.89 | 3.04 | 46.51 | 3.15 | 9.70 | 5.56 |
| 12 | 27.03 | 2.94 | 45.05 | 6.71 | 10.46 | 3.01 |
| 13 | 25.59 | 2.62 | 44.19 | 10.62 | 11.07 | 2.14 |

Experiments were conducted to simulate operation with a reductant under steady state conditions in terms of matte and slag composition while changing the chromium in the feed to observe the corresponding changes in the chromium content of the matte and slag phases. The data corresponding to 1480° C. operating temperature are given in Table 4, while those for 1550° C. operating temperature are given in Table 5.

The data given in Tables 4 and 5 indicate that increasing chrome input in the electric furnace feed 99 will increase the chrome level in both matte and slag. However, closer inspection of the data indicates that as the total chromium in the furnace feed 99 increases the proportion of chromium reporting to the slag also increases. Evidence of this can be seen in the column entitled "Chromium Ratio" which is the ratio of chrome content of the slag to that of the matte. Comparison of these ratios in Table 4, corresponding to $Fe_{Me}$ of about 70, to that in Table 5 corresponding to $Fe_{Me}$ of about 50, indicates that increasing the $Fe_{Me}$ in the matte very significantly increases the proportion of chromium reporting to the slag.

These characteristics make it possible to attain a high level of chromium rejection to the slag, while retaining low levels of chromium in the furnace matte 21, which in turn minimizes chromium input to the converters 25, thus minimizing converter operating difficulties.

TABLE 4

Impact of Changing Chromium in the Charge on Chromium Distribution Between Matte and Slag at Constant Matte and Slag Composition and 1480° C. Operating Temperature

| | Composition of Matte Wt % | | | | | |
|---|---|---|---|---|---|---|
| test No | $Fe_{Me}$ | S | Cr | Fe | Co | Ni | Cu |
| 14 | 69.23 | 9.38 | 0.47 | 76.62 | 2.01 | 7.75 | 3.77 |
| 15 | 69.95 | 9.11 | 0.58 | 76.73 | 2.03 | 7.73 | 3.83 |
| 16 | 68.99 | 9.45 | 0.69 | 76.27 | 2.00 | 7.70 | 3.91 |
| 17 | 73.39 | 7.92 | 0.80 | 78.04 | 2.03 | 7.70 | 3.50 |
| 18 | 68.54 | 9.62 | 0.95 | 75.81 | 2.07 | 7.77 | 3.78 |
| 19 | 72.81 | 8.20 | 1.32 | 77.77 | 2.08 | 6.94 | 3.69 |

| test No | Composition of Slag Wt % | | | | | | Spinel in slag | Chromium ratio |
|---|---|---|---|---|---|---|---|---|
| | MgO | Al2O3 | SiO2 | CaO | FeO | Cr | | |
| 14 | 26.75 | 4.21 | 55.65 | 3.99 | 6.14 | 1.22 | No | 2.57 |
| 15 | 26.83 | 4.10 | 55.00 | 3.95 | 6.37 | 1.58 | No | 2.73 |
| 16 | 26.58 | 4.21 | 54.47 | 3.90 | 6.55 | 1.96 | No | 2.84 |
| 17 | 26.40 | 4.07 | 53.68 | 3.86 | 6.92 | 2.53 | No | 3.18 |
| 18 | 25.89 | 4.06 | 53.11 | 3.85 | 7.37 | 2.93 | No | 3.10 |
| 19 | 24.53 | 3.32 | 50.41 | 3.51 | 8.68 | 5.67 | Yes | 4.28 |

TABLE 5

Impact of Changing Chromium in the Charge on Chromium Distribution Between Matte and Slag at Constant Matte and Slag Composition and 1550° C. Operating Temperature

| | Composition of Matte Wt % | | | | | |
|---|---|---|---|---|---|---|
| test No | $Fe_{Me}$ | S | Cr | Fe | Co | Ni | Cu |
| 20 | 46.79 | 16.74 | 1.07 | 63.55 | 2.21 | 10.34 | 6.09 |
| 21 | 48.94 | 16.02 | 0.74 | 65.18 | 2.08 | 9.95 | 6.01 |
| 22 | 49.29 | 15.88 | 0.73 | 65.16 | 2.15 | 10.13 | 5.94 |
| 23 | 50.05 | 15.70 | 1.44 | 65.24 | 2.10 | 9.80 | 5.73 |
| 24 | 48.67 | 16.12 | 1.75 | 63.96 | 2.15 | 10.16 | 5.85 |
| 25 | 49.15 | 15.91 | 1.95 | 63.81 | 2.15 | 10.04 | 6.13 |
| 26 | 48.58 | 16.13 | 2.22 | 63.29 | 2.17 | 10.25 | 5.91 |
| 27 | 46.54 | 16.75 | 2.31 | 61.67 | 2.33 | 10.65 | 6.29 |

| test No | Composition of Slag Wt % | | | | | | Chrome in slag | Chromium ratio |
|---|---|---|---|---|---|---|---|---|
| | MgO | Al2O3 | SiO2 | CaO | FeO | Cr | | |
| 20 | 30.46 | 3.55 | 50.43 | 3.42 | 8.12 | 1.67 | No | 1.57 |
| 21 | 32.12 | 3.56 | 52.12 | 3.47 | 5.94 | 1.03 | No | 1.39 |
| 22 | 31.79 | 3.55 | 52.03 | 3.48 | 6.07 | 1.25 | No | 1.72 |
| 23 | 30.90 | 3.52 | 50.50 | 3.37 | 7.02 | 2.32 | No | 1.61 |
| 24 | 29.91 | 3.42 | 49.42 | 3.29 | 7.83 | 3.33 | No | 1.91 |
| 25 | 29.44 | 3.35 | 48.18 | 3.31 | 8.44 | 4.12 | No | 2.11 |
| 26 | 28.28 | 3.21 | 46.92 | 3.11 | 9.25 | 5.43 | No | 2.45 |
| 27 | 27.76 | 2.98 | 46.38 | 3.16 | 9.85 | 5.61 | Yes | 2.42 |

A number of variations and modifications of the invention can be used. It would be possible to provide for some features of the invention without providing others.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) smelting, under reducing conditions, a furnace feed material comprising one or more Platinum Group Metals (PGMs), nickel, copper, cobalt, iron, and chromium in the presence of a reductant to form a matte and a sulfur deficient, the matte comprising at least most of the PGMs, nickel, and copper in the feed material and the slag comprising at least most of the chromium in the feed material;
   (b) separating the matte and slag from one another; and
   (c) thereafter recovering most of the PGMs from the matte.

2. The method of claim 1, wherein smelting is performed under conditions that are substantially free of electromagnetically induced mixing of the matte and slag.

3. The method of claim 1, wherein a sulfur content in the furnace feed material is sufficient to satisfy a base metal demand of the matte but not sufficient to form sulfides with at least most of the iron in the slag and wherein the reductant is selected from the group consisting of a carbon-containing material, a pig iron, aluminum, magnesium, ferrosilicon, and mixtures thereof.

4. The method of claim 1, wherein step (a) comprises the substep:
   roasting a sulfidic PGM-containing material to remove part of the sulfur and produce the feed material, wherein the sulfur remaining in the feed material is sufficient to satisfy a base metal demand of the matte but not sufficient to form sulfides with at least most of the iron in the slag.

5. The method of claim 4, wherein a roaster off-gas comprises at least about 90% of the sulfur removed as sulfur dioxide from the sulfidic PGM-containing material and wherein an off-gas of smelting contains no more than about 10% of the sulfur removed as sulfur dioxide from the sulfidic PGM-containing material.

6. The method of claim 4, wherein, after smelting, at least most of the iron and chromium in the slag is in the divalent form and wherein an $Fe_{Me}$ content in the matte ranges from about 10 to about 80 wt. %.

7. The method of claim 4, wherein the reductant is a carbon-containing material and wherein a carbon-to-charge oxygen atomic ratio in the feed material ranges from about 1 to about 2.

8. The method of claim 1, wherein the matte comprises from about 5 to about 32 wt. % sulfur, wherein FeO, MgO, and $SiO_2$ account for about 80 to about 90 wt. % of the slag, and wherein an FeO content of the slag ranges from about 5 to about 25 wt. %.

9. The method of claim 1, wherein a liquidus temperature of the slag ranges from about 1450 to about 1600 degrees Celsius and wherein a $SiO_2$ to MgO weight ratio of the slag ranges from about 1.5 to about 2.5.

10. The method of claim 1, wherein a slag superheat ranges from about 50 to about 200 degrees Celsius, a matte superheat is no more than about 400 degrees Celsius, and a delta ranges from about 100 to about 300 degrees Celsius.

11. The method of claim 1, wherein, in the matte, a molar ratio of sulfur-to-iron is less than about 0.90.

12. The method of claim 1, wherein smelting occurs in an electric furnace and wherein lower ends of adjacent first and second electrodes in the electric furnace are positioned above an upper surface of the slag to define an arc comprising ionized gases providing a conductive path through the slag between the first and second electrodes.

13. The method of claim 1, wherein the furnace-feed material comprises silica and magnesium, wherein the matte comprises at least about 15% of the cobalt, at least about 85% of each of the nickel and copper and at least about 85% of the PGMs in the feed material and wherein the slag comprises no more than about 1% of the PGMs, no more than about 85% of the cobalt, no more than about 15% of each of nickel and copper, at least about 99% of the silica, at least about 99% of the magnesium, and at least about 50% of the chromium in the furnace feed material.

14. A method, comprising:
   (a) smelting, under reducing conditions, a feed material comprising one or more Platinum Group Metals (PGMs), nickel copper, cobalt, iron, and chromium to form a matte and slag, the matte comprising at least most of the PGMs, nickel, and copper in the feed material and the slag comprising at least most of the chromium in the feed material, wherein smelting is performed under conditions that are substantially free of electromagnetically induced mixing of the slag and matte;
   (b) separating the matte and slag from one another; and
   (c) thereafter recovering most of the PGMs from the matte.

15. The method of claim 14, wherein, after smelting, at least most of the iron and chromium in the slag is in the divalent form and wherein an $Fe_{Me}$ content in the matte ranges from about 10 to about 80 wt. %.

16. The method of claim 14, wherein the matte comprises from about 5 to about 32 wt. % sulfur, wherein FeO, MgO, and $SiO_2$ account for about 80 to about 90 wt. % of the slag, and wherein an FeO content of the slag ranges from about 5 to about 25 wt. %.

17. The method of claim 14, wherein a liquidus temperature of the slag ranges from about 1450 to about 1600 degrees Celsius and wherein a $SiO_2$ to MgO weight ratio of the slag ranges from about 1.5 to about 2.5.

18. The method of claim 14, wherein a slag superheat ranges from about 50 to about 200 degrees Celsius, a matte superheat is no more than about 400 degrees Celsius, and a delta ranges from about 100 to about 300 degrees Celsius.

19. A method, comprising:
   (a) roasting a sulfidic Platinum Group Metal (PGM) and iron-containing material to remove part of the sulfur and produce a furnace feed material, wherein the sulfur remaining in the furnace feed material is sufficient to satisfy a base metal demand of a matte but not sufficient to form sulfides with at least most of the iron in the slag;

(b) smelting, under reducing conditions, the furnace feed material comprising one or more PGMs, nickel, cooper, cobalt, iron, and chromium to form the matte and a sulfur deficient slag, the matte comprising at least most of the PGMs, nickel, and cooper in the furnace feed material and the slag comprising at least most of the chromium in the furnace feed material;

(c) separating the matte and slag from one another; and (d) thereafter recovering most of the PGMs from the matte, wherein a roaster off-gas comprises at least about 90% of the sulfur removed as sulfur dioxide from the sulfidic PGM-containing material and wherein an off-gas of smelting contains no more than about 10% of the sulfur removed as sulfur dioxide from the sulfidic PGM-containing material.

20. The method of claim 19, wherein the matte comprises from about 5 to about 32 wt. % sulfur, wherein FeO, MgO, and $SiO_2$ account for about 80 to about 90 wt. % of the slag, and wherein an FeO content of the slag ranges from about 5 to about 25 wt. %.

21. A method, comprising:
(a) smelting, under reducing conditions, a feed material comprising one or more Platinum Group Metals (PGMs), nickel, copper, cobalt, iron, and chromium in the presence of a reductant to form a matte and a sulfur deficient slag, the matte comprising at least most of the PGMs, nickel, and copper in the feed material and the slag comprising at least most of the chromium in the feed material, wherein the matte comprises from about 5 to about 32 wt. % sulfur, wherein FeO, MgO, and $SiO_2$ account for about 80 to about 90 wt. % of the slag, and wherein an FeO content of the slag ranges from about 5 to about 25 wt. %;

(b) separating the matte and slag from one another; and (c) thereafter recovering most of the PGMs from the matte.

22. The method of claim 21, wherein smelting is performed under conditions that are substantially free of electromagnetically induced mixing of the matte and slag.

23. The method of claim 21, wherein the reductant is selected from the group consisting of a carbon-containing material, a pig iron, aluminum, magnesium, ferrosilicon, and mixtures thereof, and further comprising:
roasting a sulfidic PGM-containing material to remove part of the sulfur and produce the feed material, wherein the sulfur remaining in the feed material is sufficient to satisfy a base metal demand of the matte but not sufficient to form sulfides with at least most of the iron in the slag.

24. The method of claim 23, wherein a roaster off-gas comprises at least about 90% of the sulfur removed as sulfur dioxide from the sulfidic PGM-containing material and wherein an off-gas of smelting contains no more than about 10% of the sulfur removed as sulfur dioxide from the sulfidic PGM-containing material.

25. The method of claim 21, wherein, after smelting, at least most of the iron and chromium in the slag is in the divalent form and wherein an $Fe_{Me}$ content in the matte ranges from about 10 to about 80 wt. %.

26. The method of claim 21, wherein a liquidus temperature of the slag ranges from about 1450 to about 1600 degrees Celsius and wherein a $SiO_2$ to MgO weight ratio of the slag ranges from about 1.5 to about 2.5.

27. The method of claim 21, wherein a slag superheat ranges from about 50 to about 200 degrees Celsius, a matte superheat is no more than about 400 degrees Celsius, and a delta ranges from about 100 to about 300 degrees Celsius.

28. The method of claim 21, wherein, in the matte, a molar ratio of sulfur-to-iron is less than about 0.90.

29. A method, comprising:
(a) smelting, under reducing conditions, a feed material comprising one or more Platinum Group Metals (PGMs), nickel, copper, cobalt, iron, and chromium in the presence of a reductant to form a matte and a sulfur deficient slag, the matte comprising at least most of the PGMs, nickel, and copper in the feed material and the slag comprising at least most of the chromium in the feed material, wherein smelting occurs in an electric furnace and wherein lower ends of adjacent first and second electrodes in the electric furnace are positioned above an upper surface of the slag to define an arc comprising ionized gases providing a conductive path through the slag between the first and second electrodes;

(b) separating the matte and slag from one another; and (c) thereafter recovering most of the PGMs from the matte.

30. The method of claim 29, wherein smelting is performed under conditions that are substantially free of electromagnetically induced mixing of the matte and slag.

31. The method of claim 29, wherein a liquidus temperature of the slag ranges from about 1450 to about 1600 degrees Celsius and wherein a $SiO_2$ to MgO weight ratio of the slag ranges from about 1.5 to about 2.5.

32. The method of claim 29, wherein a slag superheat ranges from about 50 to about 200 degrees Celsius, a matte superheat is no more than about 400 degrees Celsius, and a delta ranges from about 100 to about 300 degrees Celsius.

33. The method of claim 29, wherein the matte comprises from about 5 to about 32 wt. % sulfur, wherein FeO, MgO, and $SiO_2$ account for about 80 to about 90 wt. % of the slag, and wherein the FeO content of the slag ranges from about 5 to about 25 wt. %.

34. A method, comprising:
(a) smelting, under reducing conditions, a furnace feed material comprising one or more Platinum Group Metals (PGMs), cobalt, copper, nickel, iron, magnesium, and chromium in the presence of a reductant to form a matte and a sulfur deficient slag, the matte comprising at least most of the PGMs, copper, and nickel in the feed material and the slag comprising at least most of the chromium in the feed material:

(b) separating the matte and slag from one another; and (c) thereafter recovering most of the PGMs from the matte, wherein the matte comprises at least about 15% of the cobalt, at least about 85% of each of the nickel and copper and at least about 85% of the PGMs in the feed material and wherein the slag comprises no more than about 1% of the PGMs, no more than about 85% of the cobalt, no more than about 15% of each of the nickel and copper, at least about 99% of the silica, at least about 99% of the magnesium, and at least about 50% of the chromium in the feed material.

35. The method of claim 34, wherein smelting is performed under conditions that are substantially free of electromagnetically induced mixing of the matte and slag.

36. The method of claim 34, wherein the reductant is selected from the group consisting of a carbon-containing material, a pig iron, aluminum, magnesium, ferrosilicon, and mixtures thereof, and further comprising:
roasting a sulfidic PGM-containing material to remove part of the sulfur and produce the feed material, wherein the sulfur remaining in the feed material is sufficient to satisfy a base metal demand of the matte but not sufficient to form sulfides with at least most of the iron in the slag.

37. The method of claim 34, wherein, after smelting, at least most of the iron and chromium in the slag is in the divalent form and wherein an $Fe_{Me}$ content in the matte ranges from about 10 to about 80 wt. %.

38. The method of claim 36, wherein a roaster off-gas comprises at least about 90% of the sulfur removed as sulfur dioxide from the sulfidic PGM-containing material and wherein an off-gas of smelting contains no more than about 10% of the sulfur removed as sulfur dioxide from the sulfidic PGM-containing material.

39. The method of claim 34, wherein a liquidus temperature of the slag ranges from about 1450 to about 1600 degrees Celsius and wherein a $SiO_2$ to MgO weight ratio of the slag ranges from about 1.5 to about 2.5.

40. The method of claim 34, wherein a slag superheat ranges from about 50 to about 200 degrees Celsius, a matte superheat is no more than about 400 degrees Celsius, and a delta ranges from about 100 to about 300 degrees Celsius.

41. The method of claim 34, wherein, in the matte, a molar ratio of sulfur-to-iron is less than about 0.90.

42. The method of claim 34, wherein smelting is performed under conditions that are substantially free of electromagnetically induced mixing of the matte and slag.

43. The method of claim 34, wherein the matte comprises from about 5 to about 32 wt. % sulfur, wherein FeO, MgO, and $SiO_2$ account for about 80 to about 90 wt. % of the slag, and wherein the FeO content of the slag ranges from about 5 to about 25 wt. %.

* * * * *